United States Patent [19]

Mintz

[11] 4,231,828
[45] Nov. 4, 1980

[54] METHOD FOR APPLYING MAGNETIC STRIPS

[76] Inventor: Leonard A. Mintz, 27 Kettering Rd., Norwood, Mass. 02062

[21] Appl. No.: 2,544

[22] Filed: Jan. 10, 1979

Related U.S. Application Data

[62] Division of Ser. No. 822,822, Aug. 8, 1977, Pat. No. 4,149,925.

[51] Int. Cl.² ............................................. B44C 3/02
[52] U.S. Cl. .................................. 156/230; 156/238; 156/254; 156/303.1
[58] Field of Search ............. 156/230, 238, 254, 303.1

[56] References Cited

U.S. PATENT DOCUMENTS

| 29,820 | 10/1978 | Konicek | 156/238 |
| 2,628,929 | 2/1963 | Persoon et al. | 156/238 |
| 3,639,188 | 2/1972 | Vogel | 156/238 |
| 3,654,016 | 4/1972 | Alexander | 151/238 |
| 3,657,054 | 4/1972 | Warsager | 151/238 |

FOREIGN PATENT DOCUMENTS 562991 9/1958 Canada ..................... 156/238

Primary Examiner—James J. Bell
Attorney, Agent, or Firm—Russell & Nields

[57] ABSTRACT

A machine and method comprising a stack of cards, a stripping feeder for stripping the bottom card from the stack and moving a series of such cards with an intermittent motion to a series of feed rollers which convert such intermittent motion into a constant velocity and for spacing the cards one from another. A tape coated with magnetic material is laid on the surface of each card by a guiding device after the card has passed through the feed rollers and the combination is fed between a heated roller and a reaction roller which are driven synchronously with the cards. The heated roller is pressed against the cards at a constant pressure exerted by an air cylinder to seal a portion of the magnetic coating to each card. The tape, carrying the sealed cards, is driven, pulling the cards along a track, allowing for cooling time until they are stripped off the tape by a stripping station which deposits the completed cards upon a belt moving at right angles to the tape-card combination in such a way that one card overlaps another, allowing the operator to view for inspection that part of the card to which the magnetic material has been applied.

4 Claims, 9 Drawing Figures

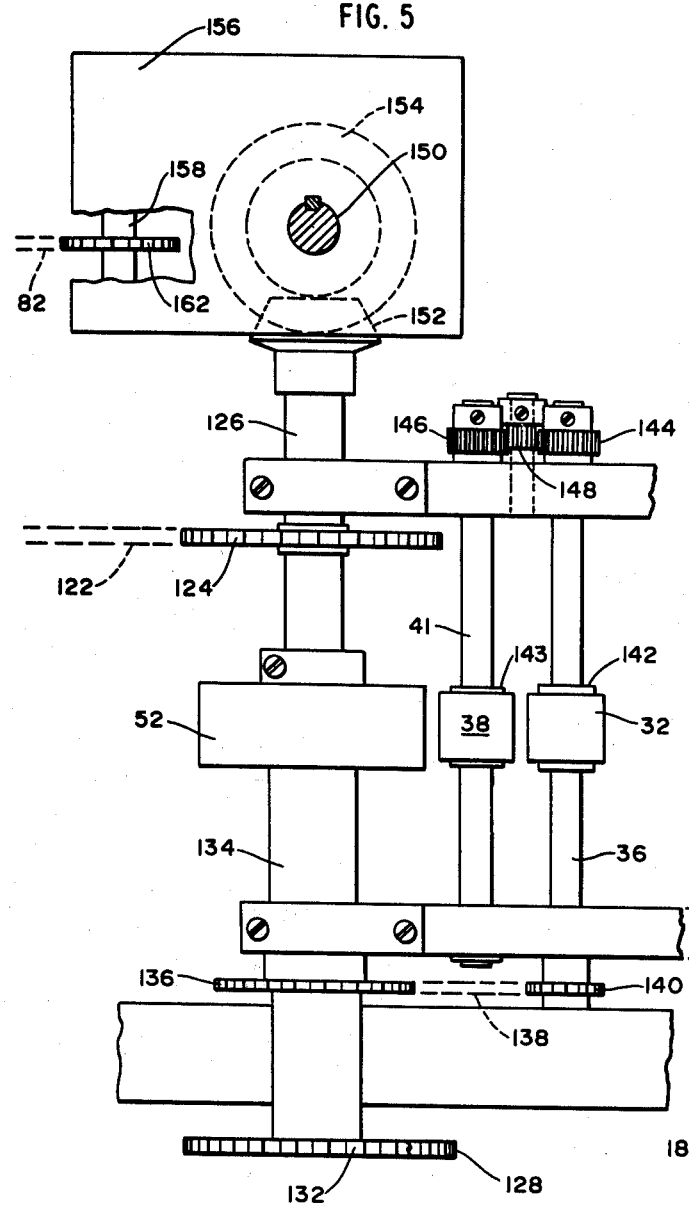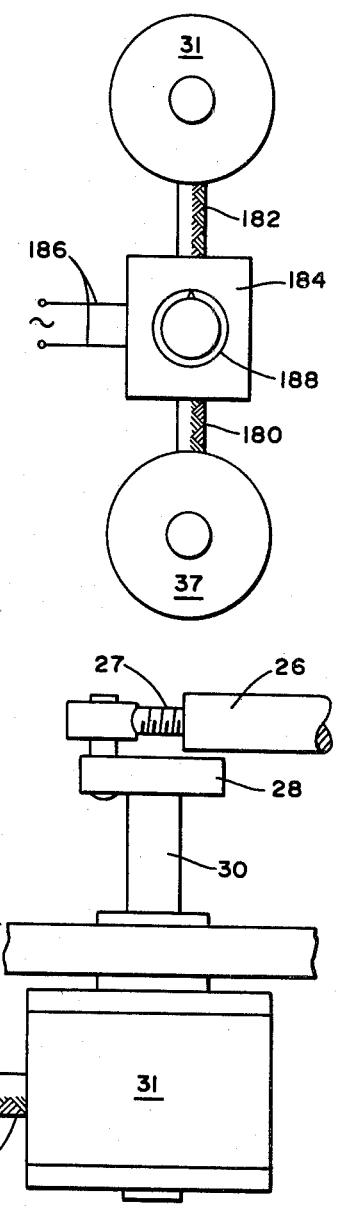

METHOD FOR APPLYING MAGNETIC STRIPS

BACKGROUND OF THE INVENTION

This application is a division of my prior copending U.S. application Ser. No. 822,822, filed Aug. 8, 1977, now allowed as U.S. Pat. No. 4,149,925.

Various data carrying items, such as credit cards, carry a thin strip of coherent magnetizable material on which information may be encoded magnetically. Such material will be referred to herein generically as magnetic material. Particularly, as is the case of credit cards, when the item is used over relatively long periods of time in many different encoding and decoding machines, it is essential that the application of the strip to the item meets very rigorous standards in order that each coding and decoding machine will accurately read or write the encoded information. For example, the surface on which the strip is affixed must be flat within close tolerances since any appreciable distortion of the surface in the vicinity of the strip will interfere with the proper positioning of the coding and decoding machines' reading or writing head with respect to the strip. Also, the strip itself must not project above the surface of the card to any appreciable extent, for the same reasons. The degree to which the prior art satisfies these requirements leaves much to be desired. The most commonly used device for applying the strip has been a hot stamping machine in which the strip is impacted against the card by a hot stamping tool. In such a machine it is difficult to avoid excessive cupping of the surface of the card which raises rims along edges of the strip with a depression between them. When the force of the impact is decreased, in an effort to avoid excessive cupping, a tendency is created for insufficient bonding of the strip to the card so that the strip tends to peel off. In addition, in such prior art machines, it has been difficult to avoid the creation of air pockets caused by entrapping air between the strip and the card. Whenever such an air pocket occurs, a void is created in the strip which constitutes an unacceptable defect. As a result such machines tend to produce an excessive number of defective strip applications, each of which spoils the card. This is wasteful and expensive since the strip application is usually the last step involved in the production of such cards.

Thus it is an object of this invention to provide a machine and method of applying such magnetic strips in a highly reliable and inexpensive manner. An additional object is to provide additional features such as automatic prestacking of the completed cards. Further objects will appear as the description proceeds.

SUMMARY OF THE INVENTION

The present invention involves the use of a constant speed driven heated roller adjacent a synchronously driven reaction roller between which the card and an adjacent elongated carrier tape coated with a coherent magnetic layer are passed. The heated roller is pressed against the carrier and card, with a predetermined constant pressure, causing the magnetic layer to seal to the surface of the card more adherently than to the tape without however releasing the layer from the tape. The mechanism for feeding cards to the heated roller comprises a reciprocating feeder member which removes the bottom card from a stack of blank cards, accelerating its forward speed to a predetermined maximum and then causing its forward speed to drop to zero as the feeder member moves back and forth in its reciprocating motion. Each card thus removed pushes against the previously removed card resulting in a train of abutting cards moving intermittently toward the heated roller. Immediately ahead of the heated roller is a set of rollers, between which the card at the head of such train is forced. One of the rollers is driven by a constant velocity shaft through a one way or overrunning clutch. The card tends to enter at a velocity greater than the velocity at which the shaft drives the roller whereby the overrunning clutch permits the card to speed up the roller. However, as the feeder member reverses its direction, the velocity of the card drops back to a value at which the one-way clutch takes over and drives the roller and the card at the predetermined constant velocity. The card is then fed into a second set of rollers. One roller of the second set is also driven by the constant velocity shaft whereby the card enters into such juxtaposition smoothly. The peripheral velocity at which the driven roller of each set is driven by its shaft is greater, by a predetermined and adjustable amount, than the average velocity imparted to the card by the reciprocating feeder. The result is that the cards which leave the second set of rollers are spaced from each other by a predetermined distance. Between the two sets of rollers, the magnetic coated tape is brought into juxtaposed contact with the cards. Thereupon the cards and juxtaposed tape are fed between the heated roller and its reaction roller.

As the tape with the cards sealed thereto leaves the heated roller, it is driven adjacent a hard chrome plated track which serves to prevent the tape-card combination from dropping too far and which also serves to assist in the cooling of the tape-card combination. Cooling of that combination may be increased by refrigerating the track, by a refrigerated air blast or otherwise.

When the card has cooled sufficiently it passes into a special set of stripping rollers which pull the card away from the tape. The magnetic coating separates sharply and cleanly along the edges of the portion which was subjected to the action of the heated roller and along the leading and trailing edges of the card. The tape, carrying the remainder of the magnetic coating is wound on a take up reel.

As each card is fed from the magnetic coated tape it drops upon a carrier belt driven in a direction at right angles to the direction of travel of the tape-card combination. The velocity of travel of the carrier belt is such that due to the difference in the velocity of the tape and the belt, the finished card drops onto the belt in an overlapping fashion which exposes the magnetic coated stripe on each card to visual inspection by the operator. Such overlap also prestacks the cards for easy final stacking and removal from the machine.

BRIEF DESCRIPTION OF THE DRAWINGS

FIG. 1a is a face view of one of the blank cards to be processed in the machine;

FIG. 1b is a face view of the card as it issues from the heated roller;

FIG. 2a is a face view of the finished card as it issued from the stripping rollers;

FIG. 5 is a view taken approximately along line 5—5 of FIG. 1 showing the driving mechanism for the various parts of the machine in FIG. 1; and FIG. 6 is a diagrammatic illustration of the control circuit for two of the motors used in the machine.

DESCRIPTION OF THE PREFERRED EMBODIMENT

Figure 1:
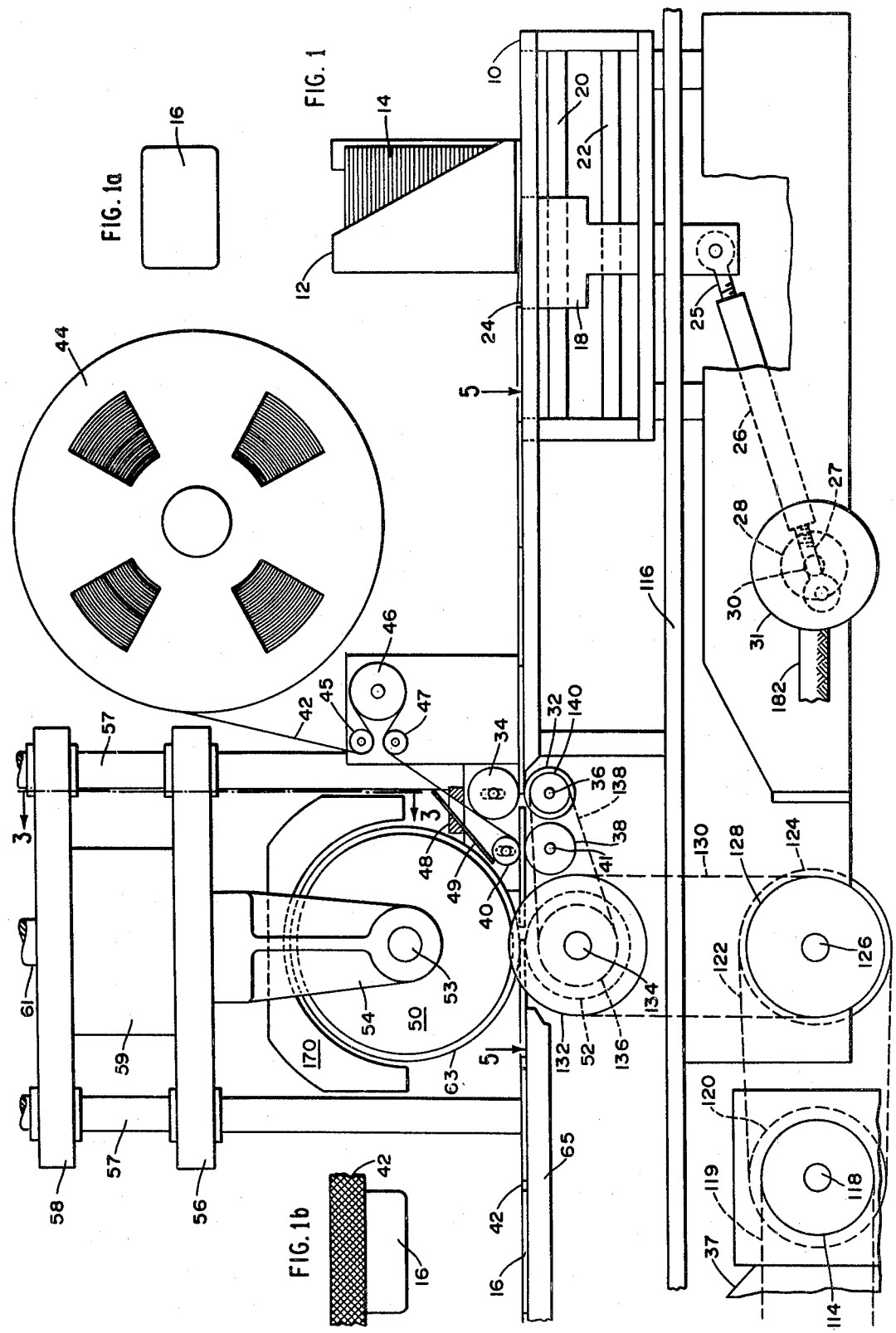
FIG. 1 is a side view of the forward half of a machine according to the present invention with a portion of the upper structure omitted.

The exemplary embodiment of the machine, according to the present invention as shown in the drawings, includes a bed 10 on which is mounted a stack 12 in which are stacked a supply 14 of cards to which a strip of magnetic material is to be applied. Such cards are of the types as exemplified by credit cards, transit cards, magnetic ledger cards, identification cards and the like. Such cards are made of a suitable material such as plastic, cardboard or the like to the surface of which the magnetic material may be sealed by the application of heat and pressure. One of the cards 16 is indicated in FIG. 1a directly above the stack 14. A feeder member 18 is mounted to slide back and forth on a pair of rods 20 and 22. The bottom of stack 12 is open and the forward edge 24 of feeder member 18 projects up through the bed 10 by approximately the thickness of one of the cards 16. The top of feeder member slopes downwardly from its forward edge. Therefore, when feeder member moves back beneath stack 12, it slides under the bottom card until its forward edge 24 clears the back edge of the card. Then, when the feeder member moves forward, edge 24 engages the bottom card, slides it off the stack 12, and moves it forward on the top of guide rails (not shown) mounted on bed 10.

The feeder member 18 is reciprocated by an adjustable crank arm or link 26 threaded at its opposite ends to rods 25 and 27. Rod 25 is pivoted at its outer end to the bottom of member 18. Rod 27 is pivoted at its outer end to a point eccentrically located on a disk 28 mounted on and driven by a shaft 30. The threads on the rods 25 and 27 are in opposite senses, so that by rotating the link 26 around its longitudinal axis the distance between the pivoted ends of rods 25 and 27 may be adjusted. Shaft 30 is rotated at a speed which is maintained at a desired relation with respect to the speed of other members of the machine, as will be described below. The forward edge 24 reciprocates with an approximately sinusoidal motion. Thus each bottom card 16 has imparted to it a velocity which starts at zero, gradually increases to a maximum value, then gradually falls to zero and remains at rest until edge 24 picks up the next bottom card 16 and moves it forward in a similar fashion. It will be noted that a series of abutting cards 16 will thus be pushed along the rails on the top of bed 10 with the intermittent variation in velocity described above.

When the forward card 16 of such series reaches the end of bed 10 it is forced between a pair of rollers 32 and 34. As will be described below, roller 32 is driven through a one-way clutch by its shaft 36. Roller 34, is a pinch roller which is spring biased towards roller 32. Shaft 36 is driven at a predetermined speed at which the velocity, at which it tends to drive the driven surfaces of roller 32, is fixed at a velocity which exceeds the average velocity at which the cards 16 move along the bed 10. The velocity at which shaft 30 is driven is determined by an adjustable velocity motor 31. The distance between the stack 12 and the roller 32 is designed so that as each card 16 enters between the rollers 32 and 34 it will be moving at a velocity greater than that at which shaft 36 is driving roller 32. The one-way clutch on shaft 36 permits card 16 to drive roller 32 at such increased velocity until the sinusoidal velocity of card 16 drops below normal speed of roller 32 at its normal rotational velocity. The result is that each card 16 has imparted to it, in a very smooth transition, a predetermined fixed velocity at which it proceeds along the machine. Due to the fact that the normal velocity of the driving surface of roller 32 is greater than the average velocity imparted to the cards 16 by member 18, each card 16 is drawn away from the following card 16 and thus as the cards 16 leave roller 32 they are spaced from each other by a predetermined distance. As will be described below, such spacing may be adjusted by adjusting the relative speeds of motor 31 and the main driving motor 37, to be more fully described below.

As each card 16 leaves rollers 32 and 34 it passes between a second set of rollers 38 and 40. Roller 38 is driven through a one way clutch from shaft 41 which is driven in synchronism with shaft 36, while roller 40 is a pinch roller which is spring biased toward roller 38. As each card 16 passes between rollers 38 and 40 it is brought into contact with a tape 42 which is similar to normal computor tape in that it consists of a plastic ribbon coated on one of its surfaces with a coherent magnetic material. Tape 42 is drawn from a supply reel 44. As tape 42 leaves reel 44 it passes over an idler roller 45 around a capstan 46 and a second roller 47. The proper tension on the tape 42 is maintained by capstan 46. Upon leaving roller 47, tape 42 passes through a guide slot in a block 48 which also carries a heat shield plate 49 to protect tape 42 against heat radiated from an adjacent hot roller 50 made of hardened tool steel. As will be described in detail below, tape 42 is driven along the machine at the same velocity at which each card 16 is driven by rollers 32 and 38 so that there is no relative motion between the tape and its adjacent card which become superimposed beneath roller 50.

Each card 16 with its superimposed tape 42 passed between the heated metal roller 50 and a reaction roller 52. Roller 52 is preferably made of a heat resistant phenolic plastic which, although hard, is sufficiently resilient to avoid any excess pressure on any part of the card 16 as it passes over roller 52. Roller 50 is driven by a shaft 53 journalled in a pair of bracket arms 54 and 55 (see also FIG. 3) carried by a movable plate 56 adapted to slide vertically on a set of vertical rods 57 carried by the frame of the machine. Spaced from plate 56 and also mounted to slide on the rods 57, is a second plate 58. Rigidly secured between plates 56 and 58 is an air pressure cylinder 59 having an internal piston 60 carried by a piston rod 61 adapted to slide through an opening in plate 58. The upper end of piston rod 61 is secured to a top plate 62 securely fastened to the upper ends of rods 57. A predetermined air pressure may be introduced into the cylinder 59 beneath the piston 60 through an air pressure pipe 62 whereupon the cylinder 60 carrying the plates 56 and 58 moves downward forcing the sealing rim 63 against the superimposed tape 42 and card 16. The air pressure supplied through pipe 62 may be adjusted by means of an adjustable air supply 64. By supplying cylinder 59 with a predetermined air pressure, the force which roller 50 exerts against the card 16 and its superimposed tape 42 is fixed at a constant value to produce the desired degree of sealing of the magnetic coating to tape 42 to card 16 without harmful distortion of the card 16. Such predetermined value is readily determined by the operator during a short trial run of a few cards 16 under a given supply of tape 42. In addition roller 50 is heated to a predetermined sealing temperature as will be described in detail further on in this specification. Thus each card 16 which passes between rollers 50 and 52 will have the magnetic coating on tape 42 sealed to it only where the sealing rim 63 of heated roller 50 exerts its pressure on card 16. The width of sealing rim 63 is fixed at the exact desired width of the magnetic strip to be carried by card 16. Tape 42 and its magnetic coating is wider than the strip sealed to card 16 by sealing rim 63. The result is that the part of the magnetic coating on tape 42 which is not sealed to card 16 is sheared away from the coating which is sealed to card 16, card 16 and tape 42 are bound together and proceed as such along the machine. FIG. 1b is a representation of a card 16 and tape 42 as they pass from beneath roller 50.

As the combined tape 42 and card 16 progresses along the machine the cards 16 move adjacent a hard, chrome-plated track 65 which serves to prevent the tape-card combination from dropping too far and which also serves to assist in the cooling of the tape-card combination to substantially room temperature, at which the bond between the cards 16 and the magnetic coating on tape 42 is firmly set. If desired the cooling of the tape-card combination may be assisted by a refrigerated air blast delivered from a blower 67. Alternative cooling means can be substituted for blower 67.

Figure 2:
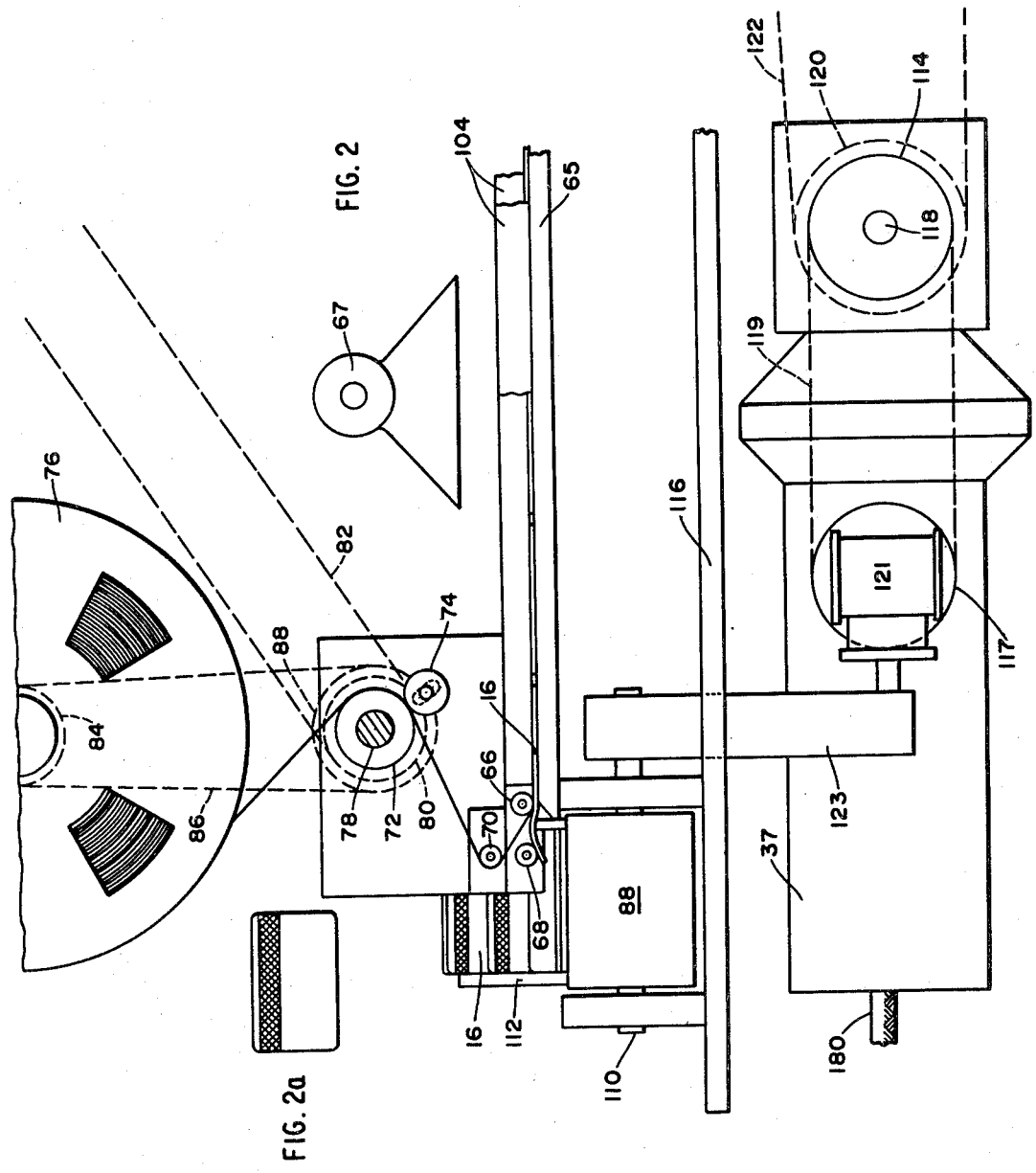
FIG. 2 is a side view of the rear half of the machine of FIG. 1.

Referring to FIG. 2, each card 16 passes beneath a hold-down roller 66, spring biased toward track 65. After each card 16 leaves hold-down roller 66, it passes beneath a pair of stripping rollers 68 and 70. As will be described more fully with respect to FIG. 3, roller 68 is located at such a level with respect to roller 66 that it bends card 16 away from roller 68. This action effectively strips tape 42 from card 16. The driving force for pulling tape 42 through the machine is supplied by a driving roller 72 adjacent a reaction roller 74. Tape 42 passes between rollers 72 and 74 is gathered by a take-up reel 76. Driving roller 72 is mounted on a shaft 78 and is driven at the proper velocity by a sprocket 80 mounted on shaft 78. Sprocket 80 is driven by a chain 82 from a drive sprocket, as will be described below. Take-up reel 76 is driven through a slipping clutch (not shown) by a sprocket 84, and chain 86 which is driven by a sprocket 88 also carried by shaft 78.

Figure 4:
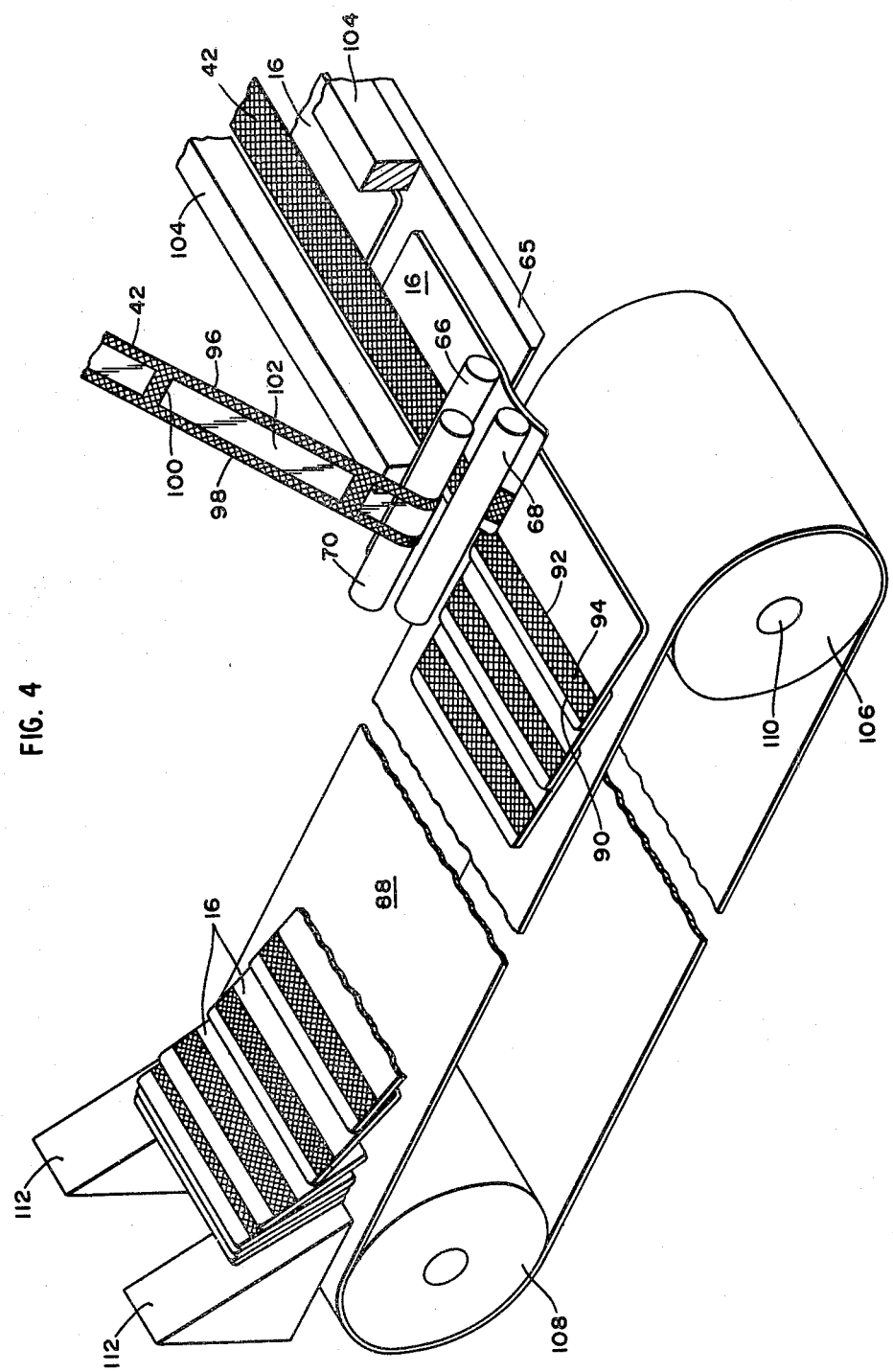
FIG. 4 is a perspective view of the mechanism for stripping the magnetic coated tape from the cards.

As the rear edge of each card 16 leaves roller 68 it has been freed from tape 42 and, being highly resilient, straightens out and thus drops down onto a belt 88 to be carried along as will be seen more clearly in FIG. 4.

The stripping of cards 16 from tape 42 also may be more clearly seen in FIG. 4. As each card 16 passes under stripping roller 68, the bending force exerted by roller 68 reacting against the pull of tape 42 as it is drawn over roller 70, causes the magnetic coating to shear cleanly along the edges 90 and 92 of the section 94 of the magnetic coating which was sealed to card 16 by the heated roller 50. Such clean shearing action also occurs at the leading and trailing edges of the card 16. Since the magnetic coating on tape 42 is wider than section 94, as tape 42 leaves roller 70 it still has adhering to its side strips 96 and 98 with cross strips 100 representing the spacing between the cards 16 before being stripped from tape 42. This leaves transparent windows 102 of the underlying plastic ribbon of tape 42.

As shown in FIGS. 4 and 2, side rails 104 are mounted at the sides of track 65 to restrain any undue side motion of the tape-card combination as it moves along track 65.

The belt 88, onto which the cards 16 drop, is driven by a pair of rollers 106 and 108 in a direction at right angles to the direction of motion along track 65. Roller 106 is driven by its shaft 110 at such a speed that the cards 16 are deposited on belt 88 in such overlapping relation so that each section 94 is displayed to the operator who may thus readily inspect the cards to detect any faulty ones. Belt 88 carries the cards 16 along until they encounter the inclined surfaces of stacking member 112 whereupon cards 16 slide up along such inclined surfaces in stacked condition to be removed from the machine by the operator. The principal source of driving power is supplied from a motor 37 (see FIG. 2) mounted below a lower machine frame member 116. Power is delivered from motor 37 through a right angle transmission to a main drive shaft 118 extending transversely of the machine. A sprocket 120, mounted on shaft 118, engages a chain 122 which, in turn, drives a sprocket 124 (see FIG. 1) mounted on a shaft 126. Shaft 126 carries a sprocket 128 which, through a chain 130, drives a sprocket 132 mounted on shaft 134. Also mounted on shaft 118 is a sprocket 114 which drives a sprocket 117 (see FIG. 2) through a chain 119. Sprocket 117 is connected to the input of a gear transmission system 121-123, the output of which drives the shaft 110 carrying roller 106 which drives belt 88.

The details of how shafts 126 and 134 drive elements of the machine are illustrated in FIG. 5 drawn to a larger scale than that of FIGS. 1 and 2. Shaft 134 carries the reaction roller 52, which is thus driven at the proper speeds.

In addition shaft 134 carries a sprocket 136 connected by a chain 138 to a sprocket 140 mounted on shaft 36 which carries driving roller 32 through a one-way clutch 142. Shaft 36 carries a gear 144 connected to gear 146 on shaft 41 through an idler gear 148. Thus shafts 36 and 41 are synchronously driven. As previously described shaft 41 carries rollers 38 through a one way clutch 143, and shaft 134 carries reaction roller 52. Shaft 126 also drives a vertical, splined shaft 150 through a pair of bevel gears 152 and 154. As will be described below, the upper end of shaft 150 drives a gear transmission system 156 having an output shaft 158 carrying a sprocket 160 which drives sprocket 80, previously referred to in FIG. 2 through chain 82.

Figure 3:
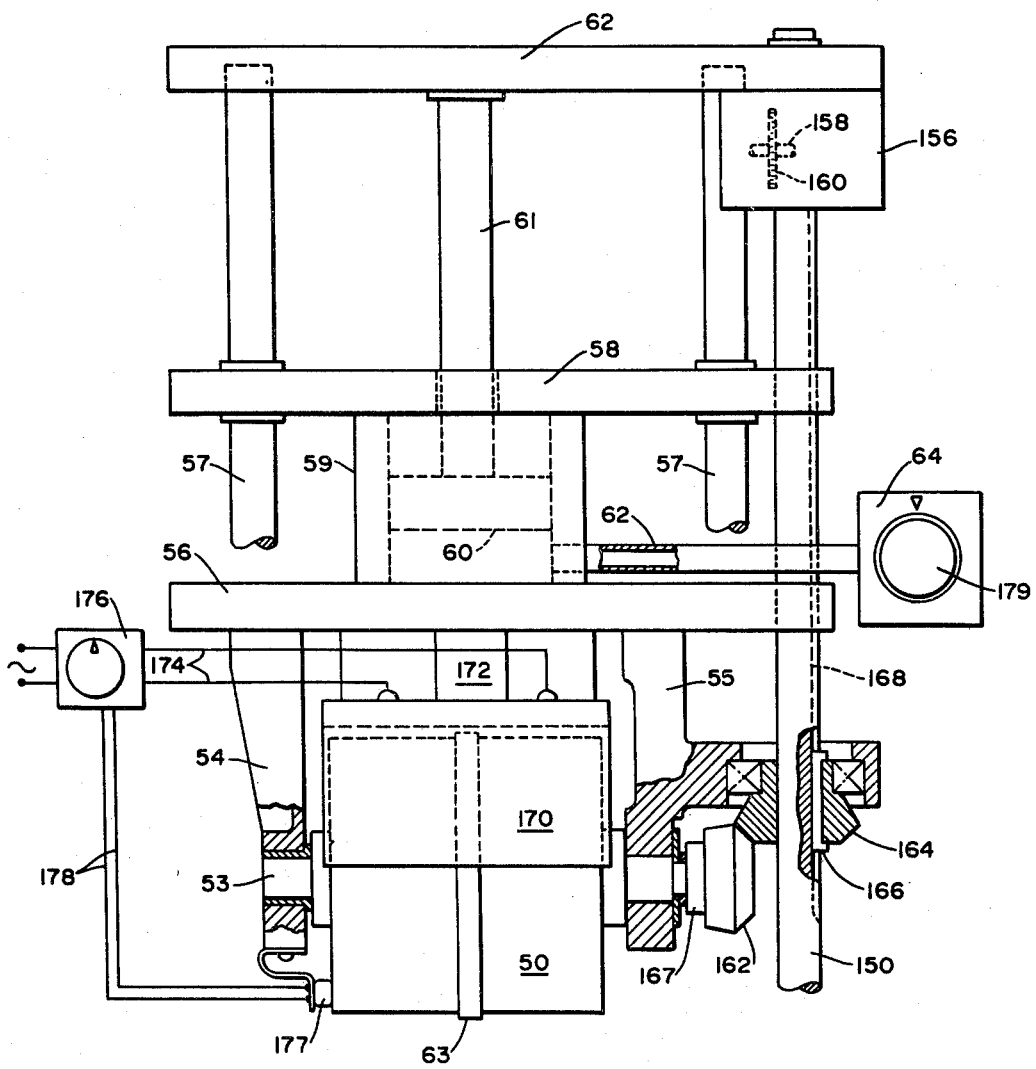
FIG. 3 is a view taken approximately along line 3—3 of FIG. 1 and also including the upper structure omitted from FIG. 1.

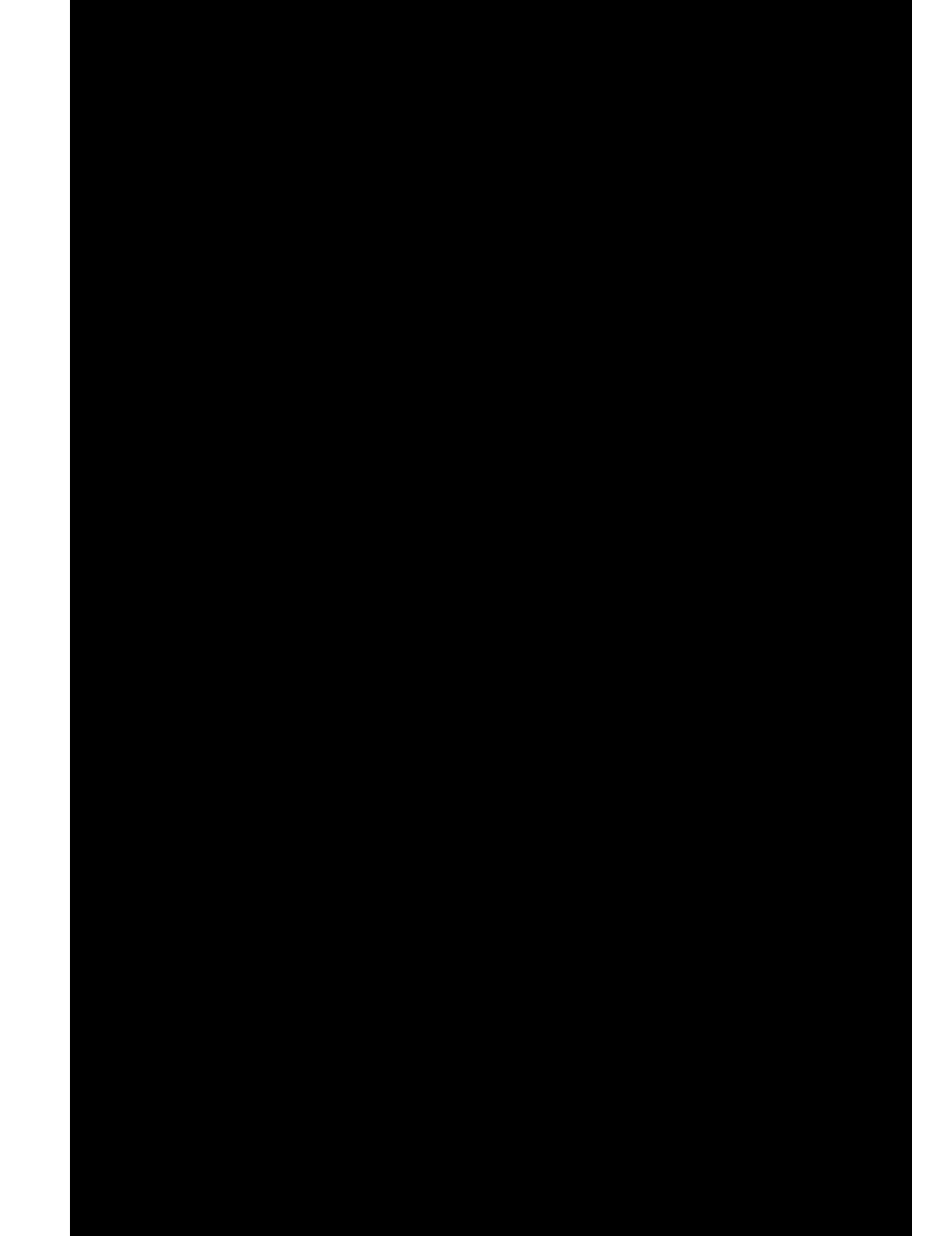

Details of the drive and control of heated roller 50 are shown in FIG. 3. Shaft 53, which carries roller 50, is driven by a set of bevel gears 162 and 164 carried in bracket arm 55 which moves up and down with the heated roller as it is moved by the piston rod 61. A one way clutch 167 is interposed between gear 162 and shaft 53. The speed of shaft 53 is set to drive the sealing rim 63 of roller 50 slightly slower than the cards 16 which are being fed to it. Clutch 167 allows the roller 50 to speed up so as to match the speed of the cards as they enter the heated roller system. Bevel gear 164 is slidably mounted on splined shaft 150 by a splined member 166 engaging an elongated spline 168 in shaft 150. Heated roller 50 is raised to its desired temperature by radiation from an electrical heated casing 170 partially surrounding roller 50. Casing 170 is mounted on movable plate 56 through a pair of insulating blocks 172, one of which